United States Patent Office 3,121,124
Patented Feb. 11, 1964

3,121,124
TERTIARY OLEFIN SEPARATION VIA ETHERIFICATION
Joseph A. Verdol, Dolton, Ill., assignor, by mesne assignments, to Sinclair Research, Inc., New York, N.Y., a corporation of Delaware
No Drawing. Filed May 4, 1959, Ser. No. 810,591
9 Claims. (Cl. 260—677)

The present invention provides for the recovery of a $C_4$–$C_7$ tertiary olefin from a mixture of the olefin with hydrocarbons of about the same boiling range, by selectively converting the tertiary olefin to a tertiary ether and separating and decomposing the ether. The process may be used to separate the tertiary olefin from petroleum refinery streams or other mixtures of the olefin with nontertiary (secondary and primary) olefins, paraffins, etc. For example, this process is suitable for the preparation of isoamylenes, for instance of greater than 99 percent purity, from $C_5$ refinery streams composed largely of n-pentane, isopentane, pentene-1, pentene-2 and isoamylenes (2-methyl-2-butene and 2-methyl-1-butene). This process is also suitable for the preparation of isobutylene from $C_4$ refinery streams composed of n-butane, isobutane, butene-2, butene-1 and isobutene as well as preparing 2,3-dimethyl-1-butene; 2,3-dimethyl-2-butene; 2-methyl-1-pentene; 2-methyl-2-pentene; 3-methyl-2-pentene (cis and trans); 2-ethyl-1-butene and 1-methyl cyclopentene from refinery streams composed of a mixture of $C_6$ olefins and paraffins.

According to the instant invention, the tertiary aliphatic, including cycloaliphatic, alkene contained in a mixed hydrocarbon stream, boiling primarily in the $C_4$ to $C_7$ range and usually containing at least about 5 to 90% or more of the tertiary alkene, is caused to selectively react with a lower aliphatic primary alcohol of up to about 6 carbon atoms and the resulting tertiary ether product is decomposed by contact with a catalyst at elevated temperatures. A refinery mixed stream generally contains about 10 to 60% tertiary alkene. A tertiary olefin contains a tertiary carbon atom, i.e. a carbon atom bonded to three other carbon atoms, connected to a carbon atom by a double bond.

This process provides a method of preparing a wide variety of substantially pure tertiary olefins, such as isobutene, isoamylenes, isohexenes and isoheptenes which are of current interest as raw materials for the synthesis of neo-acids and neo-alcohols. Neo-acids and neo-alcohols have recently aroused much interest as components of synthetic lubricants having improved oxidation resistance and high temperature properties. Tertiary olefins also are used in preparing alkylated phenols, such as tertiarybutyl phenols for use in modified phenol-formaldehyde resins. Isoamylenes, for example, are of importance as raw material for the preparation of isoprene, which is in turn used to prepare "synthetic natural" rubber. The 3-methyl-1-butene which is prepared from 2-methyl-2-butene or 2-methyl-1-butene is of interest as a monomer for the preparation of polymers. Isobutylene of high purity is desired for the preparation of butyl rubber. There are numerous other applications for tertiary olefins.

The etherification can be performed, for instance, by using an ion-exchange material in the hydrogen form and in an amount sufficient to catalyze the selective conversion to the tertiary alkyl ether. The ether thus formed can be easily separated from the reaction mixture by distillation and the substantially pure tertiary alkene recovered in good yields by decomposing the ether. The decomposition reaction is carried out by contacting the tertiary ether with a strongly acidic catalyst at elevated temperatures to recover the tertiary olefin and alkanol reactants.

The organic hydrogen ion exchange etherification catalysts useful in accordance with the present invention are relatively high molecular weight water-insoluble resins or carbonaceous materials containing an $SO_3H$ functional group or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and in this case must be activated to the hydrogen form by treatment with mineral acid, such as hydrochloric acid, and water washed to remove sodium and chloride ions prior to use. Sulfonated resin type catalysts include the reaction products of phenol-formaldehyde resins with sulfuric acid (Amberlite IR-1, Amberlite IR-100, and Nalcite MX). Also useful are the sulfonated resinous polymers of courmarone-indene with cyclopentadiene, sulfonated polymers of courmarone-indene with furfural, sulfonated polymers of courmarone-indene with cyclopentadiene and furfural and sulfonated polymers of cyclopentadiene with furfural. The preferred cationic exchange resin is a strongly acidic exchange resin consisting essentially of a sulfonated polystyrene resin, for instance a divinylbenzene cross-linked polystyrene matrix having about 0.5 to 20 percent, preferably about 4 to 16%, divinylbenzene therein to which are attached ionizeable or functional nuclear sulfonic acid groups. This resin is manufactured and sold commercially under various tradenames, e.g. Dowex 50, Nalcite HCR. This resin, as commercially obtained, has a moisture content of about 50% and it can be used in the instant process in this form or it can be dried and then used with little or no differences in results ascertainable. The resin can be dried as by heating at a temperature of about 212° F. for 12 to 24 hours or the free water can be removed as by refluxing with benzene or similar solvents and then filtering.

The resin particle size is chosen with a view to the manipulative advantages associated with any particular range of sizes. Although a small size (200–400 mesh) is frequently employed in autoclave runs, a mesh size of 20–50 or larger seems more favorable for use in fixed bed or slurry reactors. The catalyst concentration range should be sufficient to provide the desired catalytic effect, e.g. between about 0.5 and 50 percent (dry basis) by weight of the reactants, with the preferred range being between about 5 to 25 percent (dry basis), for example, 10 percent.

In a continuous reactor the catalyst concentration is better defined by weight hourly space velocity; that is to say, the weight of feed processed per weight of catalyst per hour. A weight hourly space velocity of about 1 to 8 (based on hydrocarbon feed) and up to about 17 based on total hydrocarbon and alcohol feed may be used with advantage. The WHSV can be about 0.1 to 100 based on hydrocarbon feed only, with the preferred WHSV being about 2 and 20.

The ether is formed by reacting the tertiary olefin in the hydrocarbon mixture with a primary alcohol, whether mono- or polyfunctional. A ratio of about 0.1 to 100 moles of primary alcohol (or polyol containing primary hydroxyl groups) per mole of tertiary olefin may be used in the etherification with the usual amount being between about 1 and 10 moles of primary alcohol per mole of tertiary olefin, preferably about 5 to 10 moles of the alchol. A high ratio of alcohol to t-olefin increases the amount of olefin taken from the mixed hydrocarbon feed stream.

Primary alcohols, whether mono- or polyfunctional are effective in the etherification step of this process. Althrough secondary alcohols do react with tertiary olefins, the conversion rate is too low for practical purposes. Economy and ease of volatilization during the decomposition step generally dictate the use of alcohols of 1 to 6 carbon atoms, and in general, ethanol and methanol are preferred because of economy and, usually, they afford higher conversion rates, as shown in Table I.

In the runs listed in Table I, below, the respective alcohols were reacted with a petroleum refinery hydrocarbon stream containing 38.4 percent isoamylenes (2-methyl-2-butene and 2-methyl-1-butene) as well as $C_5$ paraffins and other $C_5$ olefins. The feed was charged to an autoclave with an excess of the alcohol shown (usually 5 to 10 moles of alcohol per mole of refinery feed). About 5 to 20 percent by weight of a Dowex 50 catalyst described above was added and the mixtures were heated in the autoclave under autogenous pressure at 150 to 175° F. for a period of about 5 hours. The reaction mixtures were then analyzed by vapor phase chromatography (VPC) to determine the amount of isoamylenes converted to tertiaryamyl alkyl ethers.

Table I

| Example | Alcohol Reactant | Identity of Ether Formed | Percent Conversion of Iso-amylenes to Ether(s) |
|---|---|---|---|
| I | Methanol | Tertiaryamyl methyl ether. | 70-79 |
| II | Ethanol | Tertiaryamyl ethyl ether | 50-55 |
| III | Butanol | Tertiaryamyl butyl ether | 38-39 |
| IV | Isopropanol | Tertiaryamyl isopropyl ether. | 10-15 |
| V | Ethylene Glycol | Ethylene glycol mono- and ditertiaryamyl ether. | 10-13 |
| VI | 3-methyl-1,5-pentanediol. | 3-methyl-1,5-pentanediol mono- and ditertiary-amyl ether. | 17 |

The etherification temperature range is about 100–350° F., with the preferred limit being from about 100–225° F. The lower temperature range is preferred, since the formation of the tertiary ether is favored, and the formation of dialkyl ether (dimethyl ether in the case of methanol being used as the alcohol reactant) is not significant at lower temperatures. Runs performed at autogenous pressures and others performed under nitrogen pressure of 400–500 p.s.i.g. showed that pressure has no significant effect upon the reaction. The pressure may range from about atmospheric pressure to about 5000 p.s.i.g. or more, with the preferred limits being between about atmospheric pressure and about 600 p.s.i.g. Pressures above atmospheric pressure may be required to maintain the reactants in the liquid phase; however, the reaction can be carried out at autogenous pressure in a continuous system, which is preferred for commercial operation. Batchwise reaction in an autoclave is feasible.

The decomposition of tertiaryamylmethyl ether, for example, to isoamylenes and methanol at a rapid rate and under mild conditions by contact with a strong acid catalyst enables one to obtain isoamylenes of extremely high purity. The purity of the isoamylenes obtained by this process can be greater than 99 percent. The purity of the isoamylene may be determined by the purity of the tertiaryamylmethyl ether employed in the regeneration reaction. However, the presence of impurities such as tertiaryamyl alcohol in the tertiaryamylmethyl ether produces no change in isoamylene purity because this alcohol is converted to isoamylenes under the reaction conditions. Also, performing the decomposition step is greatly simplified by the additional discovery that the ether may be decomposed in the presence of excess alcohol without material conversion of alcohol to dialkyl ether. Therefore, after the etherification step, only unreacted hydrocarbon need be removed before decomposition, although, if preferred, some excess alcohol may be removed by distillation leaving an alcohol-ether azeotrope for decomposition, or all of the alcohol may be removed from the ether, as, for example, by water-washing.

If it is decided to use the azeotrope in the decomposition step, the boiling point of the alcohol to be used in the etherification step is of some concern. For example, although the reaction of isoamylene and ethanol gives a lower conversion than the reaction of isoamylene and methanol, tertiaryamyl ethyl ether and ethanol give an azeotrope (80% ether, 20% alcohol) boiling at 66° C. while the boiling point of ethanol is 79° C. The azeotrope is thus easily separated from the ethanol by distillation for decomposition to isoamylenes which are readily separable from the azeotrope alcohol and the ether-produced alcohol by a further distillation. Tertiaryamyl methyl ether, however, forms an azeotrope with methanol which boils at 62 to 63° C., too close to the boiling point of methanol (65 to 66° C.) to permit efficient separation of excess methanol by distillation. Therefore, the characteristics of azeotropes formed in the ether manufacture can influence the choice of alcohol to be used for etherification.

The decomposition of the tertiaryalkylalkyl ether to tertiary olefin and alcohol is performed generally in a temperature range of about 100° to 400° F. and the temperature can be selected in accordance with the particular strong acid catalyst used. The strong acid catalysts can furnish one or more protons and included in this group are organic and inorganic acids and acid salts such as sulfonic acids, sulfuric acids, phosphoric acids, sodium bisulfate, etc., which have a dissociation constant of at least about $1 \times 10^{-3}$. Useful sulfonic acids include particularly those ion exchange resins in the hydrogen form as described above. The strong acid catalysts which are solid at reaction temperatures are preferred. Generally, the amount of acid employed as a catalyst is about 1 to 25 weight percent of the tertiary ether, preferably about 5 to 20%. For a continuous reaction the amount of catalyst and ether employed usually give a space velocity of about 0.5 to 10 WHSV.

The decomposition of the tertiary ether to tertiary olefin may be carried out in an autoclave reactor under autogenous pressure, or in a continuous reactor at atmospheric pressure. The lower pressure, as well as a low temperature is preferred when an acid ion exchanger is used. For example, when tertiaryamylmethyl ether was placed in an autoclave with Dowex 50 catalyst in the hydrogen form at 200° F., the concentration of isoamylene formed was found to be in the range of 62–67 percent. However, when the tertiaryamylmethyl ether was passed through a reactor at 200° F. packed with the same Dowex 50 catalyst, it was possible to convert about 82 percent of the ether to isoamylenes. At 250° F. more than 90 percent of the tertiaryamylmethyl ether was converted to isoamylenes but under these conditions a substantial amount of the methanol was converted to dimethyl ether, making this material unavailable for recycle to the olefin etherification step without intermediate processing. As stated the temperature range for decomposition of the ether to give the olefin may vary from about 100 to 400° F. With the sulfonic acid resin catalysts, the range is better between about 100–350° F., with the preferred temperature being between about 175–300° F. Other catalysts may be better suited with other preferred temperatures, for instance the polyphosphoric acid catalyst, e.g. deposited on a solid carrier, seems most useful at temperatures of about 200 to 350° F.

The tertiary ethers derived from a primary alcohol and tertiary olefin undergo the decomposition reaction to form the initial tertiary olefin and alcohol. Thus, the tertiary ether has the structure R—O—R' where R is an aliphatic hydrocarbon radical of 4 to 7 carbon atoms with a tertiary carbon atom in the alpha position and R' is an aliphatic hydrocarbon radical of 1 to 6 carbon atoms. When the ether is derived by the reaction of a tertiary olefin and a primary alcohol, the alpha carbon atom of R' is a primary carbon atom. R and R' may be substituted with constituents which do not interfere with the desired reaction. Typical examples would be tertiary-amylmethyl ether, tertiaryamylethyl ether, tertiaryamylpropyl ether, tertiarybutylmethyl ether, tertiarybutylethyl ether, tertiarybutylpropyl ether, etc. Higher molecular weight ethers also undergo this reaction.

It is preferred to carry out the decomposition or cracking reaction at atmospheric pressure or slightly below atmospheric pressure. The pressure will usually be between about ½ to 25 atmospheres, with the preferred being about 1 atmosphere. The reaction can be carried out batchwise or in a continuous or semi-continuous reactor system, and vapor phase reactions are preferred although liquid phase reactions can be used.

The present invention can be illustrated by reference to the following specific examples which are not to be considered as limiting the scope of the invention.

EXAMPLES VII TO IX

A 1-liter autoclave was charged with 125 ml. of 2-methyl-2-butene, 125 ml. of 2-pentene and 250 ml. of methanol. Fifty grams of Dowex 50X–12 catalyst (sulfonated polystyrene-divinylbenzene resin containing 12% divinylbenzene, mesh size of 50–100, 42–48% $H_2O$) was charged to the autoclave, which was heated to the desired temperature for a period of about seven hours. The products were worked up by washing the methanol from reaction mixture and then distilling the remaining products at atmospheric pressure. In all these runs the only olefin-methanol reaction products isolated by distillation of the reaction mixtures were tertiary-amylmethyl ether and tertiaryamyl alcohol. The results of these operations are summarized in Table II below.

*Table II*

AUTOCLAVE RUNS INVOLVING REACTION OF A 50:50 MIXTURE OF PENTENE-2 AND 2-METHYL-2-BUTENE WITH METHANOL

|  | VII | VIII | IX |
|---|---|---|---|
| Reactants | 125 ml. 2-Pentene 125 ml. 2-Methyl-2-Butene 250 ml. Methanol | | |
| Mole Ratio of Methanol to 2-Me-2-Bu | 5.3 | 5.3 | 5.3 |
| Reaction Temp., °F | 200 | 250 | 300 |
| Reaction Time, hrs | 7 | 7 | 7 |
| Percent conversion of 2-Me-2-Bu to t-amylmethyl ether | 65 | 49 | 41 |
| Percent conversion of 2-Pentene to 2-Methoxy Pentane | <1 | <1 | <1 |
| Percent conversion of 2-M-2-Bu to t-Amyl Alcohol | 12 | 11 | 3 |
| Total percent Conversion of 2-Me-2-Bu | 77 | 60 | 44 |
| Percent Conversion of Methanol to Dimethyl Ether | 1.5 | 30 | 76 |

EXAMPLES X AND XI

In the following examples a mixed $C_5$ hydrocarbon feed obtained from a petroleum fluid catalyst cracking unit was employed as the source of material containing isoamylenes. Analysis of this feed showed that it had the following weight percent composition:

Isopentane _____ 26.9
n-Pentane _____ 5.9
Pentene-1 _____ 4.7
Pentene-2 _____ 19.6
2-methyl-2-butene _____ 28.6
2-methyl-1-butene _____ 12.8
Hexenes _____ 1.5

The total weight percent of isoamylenes in the feed was 41.4 percent.

Several runs were carried out by charging the desired amounts of $C_5$ refinery feed and methanol to a 1-liter autoclave, so that the total charge was 500 ml. The catalyst was added to the autoclave (50 gms. of Dowex 50X–12) and the autoclave was sealed and heated to the desired temperature for about 7 hours. After cooling and depressurizing the bomb the reaction mixtures were worked up by washing out the methanol and collecting the remaining products by distillation at atmospheric pressure. In the runs conducted, the only olefin-methanol reaction product formed was tertiaryamylmethyl ether. Table III below summarizes runs which vary in reaction temperature and ratio of methanol to $C_5$ feed.

*Table III*

| Example | X | XI |
|---|---|---|
| Ml. Methanol Used | 250 | 150 |
| Ml. Mixed $C_5$ Feed Used | 250 | 300 |
| Mole Ratio of Methanol to Isoamylenes | 6.5/1 | 15.3/1 |
| Volume Ratio Methanol to $C_5$ Feed | 1/1 | 2/1 |
| Reaction Temp., °F | 150 | 200 |
| Reaction Time, hrs | 7 | 7 |
| Percent Conversion of Isoamylenes In Feed to Tertiaryamylmethyl Ether | 57 | 80 |
| Percent Conversion of Isoamylenes to Tertiaryamyl Alcohol | 6 | 0 |
| Total Percent Conversion of Isoamylenes | 63 | 80 |
| Percent Conversion of Methanol to Dimethyl Ether | 0 | 3 |

EXAMPLES XII TO XIV

The following operations were carried out in order to determine whether or not the reaction of isoamylenes and methanol in the presence of Dowex 50 catalyst was adaptable to continuous processing. The reactions were carried out in a stainless steel upflow reactor heated by a circulating heat exchanger. The methanol and hydrocarbon feed were mixed to give the desired composition and the mixed feed was pumped into the bottom of the reactor. The reactor was maintained at 400–500 lbs./in.$^2$ gauge (nitrogen) pressure in order to maintain a liquid phase throughout the system. The reactor was packed with Dowex 50X–8 catalyst having a divinylbenzene content of 8%, which had a mesh size of 20–50 mesh. The moisture content of the fresh catalyst was 45–55 percent. However, the moisture content diminished with use, since the water content of the feed was quite low. The reactor was approximately 1 inch in diameter and 30 inches in length. The reactor was packed with the desired amount of catalyst which would enable the experiment to be carried out at the pre-calculated space velocity.

The reactor was brought to the desired reaction temperature and the pump was set to the desired rate. The reactants were removed from a dip tube located about 1 inch from the top of the reactor and which led to a knockout pot located at a level approximately equal to that of the bottom of the reactor. Products were removed from the knockout through a cold water condenser and finally into a series of Dry Ice traps. The product was removed from the reactor at a rate equal to that of the inlet feed. The reaction mixtures were worked up by washing the methanol from the crude reaction products and distilling the remainder of the reaction products at atmospheric pressure.

Table IV summarizes the results of a series of reactions which were carried out in the continuous reactor.

| Example | XII | XIII | XIV |
|---|---|---|---|
| Hydrocarbon Feed | (¹) | (¹) | (¹) |
| Volume Ratio of Methanol to Hydrocarbon Feed | 1/1 | 1/1 | 1/1 |
| Catalyst | (²) | (²) | (²) |
| Mole Ratio of Methanol to Isoamylenes | 6.5/1 | 6.5/1 | 6.5/1 |
| Total Weight Hourly Space Velocity | 2.2 | 4.4 | 17.6 |
| Weight Hourly Space Velocity Based on Hydrocarbon Feed | 1 | 2 | 8 |
| Reaction Temp., °F | 200 | 200 | 200 |
| Percent Conversion of Isoamylenes to t-amylmethyl Ether | 58 | 60 | 65 |
| Percent Conversion of Isoamylenes to t-amyl Alcohol | 5 | 0.4 | -------- |
| Total Conversion of Isoamylenes | 63 | 60.4 | 65 |
| Percent Conversion of Methanol to Dimethyl Ether | <1 | 6 | 0 |

¹ Mixed $C_5$ Feed (containing 41.4 percent isoamylenes).
² Dowex 50X–8.

EXAMPLE XV

The following run was carried out in order to demonstrate that the selective reaction of isobutylene and methanol can be carried out in a continuous flow reactor. The reactor described above was maintained at 400–500 lbs./in.² nitrogen pressure in order to maintain a liquid phase through the course of the reaction. The hydrocarbon feed employed was a mixture of isobutylene and butene-1, containing 51.5 percent isobutylene. The reactor was packed with Dowex 50X–8 catalyst as described in the previous examples. The reactor was heated to about 160° F. and the methanol and hydrocarbon feed were pumped into the reactor separately. The hydrocarbon feed was pumped into the reactor at a rate of 205 grams per hour and the methanol was pumped into the reactor at a rate of 278 grams per hour. After running the experiment for two hours a total of 954 grams of product was collected. Analysis of the reaction mixture showed that 85 percent of the isobutylene in the mixed butene-1-isobutylene feed was converted to tertiary butyl methyl ether. No secondary butyl methyl ether was detected in the reaction mixture.

The tertiary butyl methyl ether is easily recovered in purified form from one portion of the reaction mixture by distilling off the unreacted $C_4$ hydrocarbons and subsequently washing out the methanol from the rest of this portion with water. The other portion was subjected first to a distillation which removes the unreacted $C_4$ hydrocarbons from the reaction mixture. Further distillation gave an azeotrope containing 85 percent by weight of tertiary butyl methyl ether and 15 percent by weight of methanol. This azeotrope showed B.P. 51–52° C. $n_D^{25}$ 1.3640 and was easily decomposed directly to afford isobutylene and methanol. The weight hourly space velocity for this experiment was 12 based on total feed of methanol and hydrocarbon and 5.1 based on hydrocarbon alone.

EXAMPLE XVI

A run was conducted to show that a variety of olefins could be extracted from a selected cut of a refinery stream boiling in the range of $C_6$ paraffins and olefins. The complete analysis of the refinery stream could not be determined, owing to the complexity of the mixture. The refinery stream selected for this study was obtained by distilling a fluid catalytically cracked gasoline to obtain a fraction boling at 110–163° F. Analysis of the stream showed that it contained a total olefin content of 62 percent.

The run was conducted in the continuous reactor already described, which was packed with Dowex 50X–8 catalyst (20–50 mesh). A mixture of the $C_6$ fraction and methanol was pumped into the reactor at a rate of about 1000 gms. per hour. The feed was prepared by mixing equal volumes of the $C_6$ refinery stream and methanol. The total weight hourly space velocity employed was 10 (based on weight of refinery feed and methanol). The reactor was brought to a temperature of 200° F. and maintained at a pressure of 500 p.s.i.g. with nitrogen. A prerun was made at this temperature before starting the run, in order to obtain equilibrium conditions in the reactor system.

The total product after operating the run for one hour weighed 1055 grams. Analysis of the product by VPC showed that 36 percent of the $C_6$ refinery stream was converted to tertiaryhexylmethyl ethers. The ethers were isolated from the reaction mixture by washing out the methanol with water and distilling the residue. The mixed tertiaryhexylmethyl ethers were collected at 105–111° C., $n_D^{25}$ 1.4013–1.4019.

EXAMPLES XVII AND XVIII

The following runs show the conversion of tertiaryamylmethyl ether to isoamylenes and methanol.

Runs were conducted by employing a stainless steel bomb as a reactor. The runs were made by placing 10 ml. of tertiaryamylmethyl ether (B.P. 86–86.50° C. $n_D^{25}$ 1.3860) and 2.5 gms. of Dowex 50X–12 catalyst in a 30 ml. steel bomb. The bomb was then placed in an oil bath and agitated continuously at the designated temperature throughout the course of the reaction. The bomb was quickly removed from the oil bath and quenched in an ice bath. The cooled bomb was opened and the products analyzed by vapor phase chromatography (VPC). Table V summarizes the results of two runs which were conducted in this manner.

*Table V*

| Example | XVII | XVIII |
|---|---|---|
| Reaction Temp., °/F | 200 | 250 |
| Reaction Time, hrs | 4 | 6 |
| Weight Percent Isoamylenes | 42.3 | 62.3 |
| Weight Percent Tertiaryamylmethyl Ether | 43.1 | 21.6 |
| Weight Percent Tertiaryamyl Alcohol | 4.6 | 3.3 |
| Weight Percent Dimethyl Ether | 0.0 | 4.7 |
| Weight Percent Methanol | 10 | 6.5 |

EXAMPLE XIX

A Pyrex tube 40 cm. in length and 2.5 cm. in diameter was packed with 50 grams of Dowex 50X–8 catalyst and heated in an electric furnace at 200–210° F. Tertiaryamylmethyl ether B.P. 85–86.5° C. $n_D^{25}$ 1.3860 (which was prepared from the reaction of the refinery feed described above with methanol) was pumped through the tube at a rate of 50 ml. per hour. The product of the reaction was collected in Dry Ice traps located below the Pyrex reactor tube. The reactor was at atmospheric pressure. The product of the reaction was washed free of methanol with cold water and distilled at atmospheric pressure to give the regenerated isoamylenes and unreacted tertiaryamylmethyl ether. Analysis showed that 82 percent of the tertiaryamylmethyl ether was converted to isoamylenes. Analysis of the isoamylenes obtained by the decomposition of the tertiaryamylmethyl ether showed the following:

Percent composition of recovered isoamylenes—
    2-methyl-1-butene _____ 12.0
    2-methyl-2-butene _____ 88.0

The isoamylenes, as shown by the above analysis, contained no impurities that could be detected by VPC analysis. The recovered isoamylenes therefore appear to save a purity of 99.9 percent plus.

EXAMPLE XX

Another run was carried out in the same reactor described above, except that the reactor was maintained at a temperature of 250–270° F. Analysis of the product showed that more than 90 percent of the tertiaryamylmethyl ether was converted to isoamylenes. Analysis also indicated that over 50 percent of the methanol was converted to dimethyl ether.

EXAMPLE XXI

It has been demonstrated that the tertiaryhexylmethyl ethers can be decomposed to afford tertiary olefins. The apparatus used for this decomposition was described for the runs relating to the decomposition of tertiaryamylmethyl ether and tertiarybutylmethyl ether. The conditions employed for the run and the identity of the tertiary $C_6$ olefins isolated are given in Table VI below. The decomposition reaction was run with the tertiaryhexylmethyl ethers obtained from the operation described in Example XVI. The ethers were freed of methanol prior to decomposition.

*Table VI*

| | |
|---|---|
| Catalyst | Dowex 50X–8 |
| Temperature, °F | 200 |
| Percent conversion of tertiary ethers to tertiary olefins | 74 |
| WHSV | 1.25 |

Identity and approximate composition of tertiary olefins obtained:

| | |
|---|---:|
| 1-methylcyclopentene [1] | 2.85 |
| 2,3-dimethyl-1-butene | 1.33 |
| 2-methyl-1-pentene | 10.51 |
| 2-ethyl-1-butene | 1.81 |
| 2-methyl-2-pentene | 40.70 |
| 3-methyl-2-pentene trans | 11.96 |
| 3-methyl-2-pentene cis | 26.69 |
| 2,3-dimethyl-2-butene | 6.15 [2] |

[1] Identification tentative.
[2] Includes impurity present.

All of the olefins obtained from the decomposition of the tertiaryhexylmethyl ethers were tertiary olefins. This further demonstrates the selectivity of the ether process for recovery of tertiary olefins from refinery streams.

EXAMPLES XXII TO XXIX

Table VII below shows the decomosition of tertiarybutylmethyl ether and tertiaryamylethyl ether to isobutylene and isoamylenes, respectively, using two different strong acid catalysts.

*Table VII*

| Example | XXII | XXIII | XXIV | XXV | XXVI | XXVII | XXVIII | XXIX |
|---|---|---|---|---|---|---|---|---|
| Catalyst | Dowex 50X-12 | | | | | | 18% polyphosphoric acid supported on kieselguhr | |
| Feed | t-butylmethyl ether | | azeotrope-21% ethanol 79% t-amylethylether | | azeotrope-15% methanol | | 85% t-butylmethyl ether | |
| Temp., °F | 200 | 250 | 270 | 270 | 220 | 250 | 220 | 300 |
| WHSV | 0.6 | 0.6 | 0.94 | 10 | 1.0 | 1.0 | 1.4 | 1.4 |
| Percent Conversion ether to olefin | 50 | 86 | 97 | 41.5 | 52 | 79 | 57.5 | 97 |

EXAMPLES XXX TO XXXII

In the following examples, a mixture of 83% methanol and 17% tertiaryamylmethyl ether obtained by methanol treatment of a $C_5$ petroleum refinery fraction and separation of unreacted hydrocarbons was passed over an 18% polyphosphoric acid-on-kieselguhr catalyst at 270° F. at varying rates. The very low conversions reported in Table VIII of methanol to dimethyl ether shows that a separate step of removing the excess alcohol before decomposition is not necessary.

*Table VIII*

| Example | XXX | XXXI | XXXII |
|---|---|---|---|
| WHSV | .652 | 1.96 | 5.81 |
| Percent Conversion ether to isoamylenes | 100 | 82 | 51.5 |
| Percent Conversion methanol to dimethyl ether | 1.57 | 0.38 | 0.015 |

All of the above regenerations serve to demonstrate the efficiency of the regeneration step, and show quite conclusively that the process provides tertiary $C_4$ to $C_7$ hydrocarbons of extremely high purity. The alcohol, of course, is also easily recoverable and can be recycled to the etherification step.

In commercial operation, for example, based on isobutylene extraction with methanol or isoamylene extraction with ethanol; alcohol, along with the $C_4$ or $C_5$ mixed stream from a petroleum refinery could be fed continuously to a fixed bed reactor containing the ion exchange catalyst. The resulting mixture of starting materials and ether is then sent to a distillation column to remove the unreacted $C_4$ or $C_5$ hydrocarbons. The bottoms fraction containing alcohol and ether is sent to a second fixed bed catalytic reactor for decomposition to give substantially pure olefin, alcohol and some unreacted material. A final fractionator separates the olefin overhead for collection as a product while the mixture of alcohol and undecomposed ether may be returned to the first or second reactor.

Alternatively, the bottom fraction from the first distillation column may be sent to a second fractionator, before the decomposition reactor, where an ether-alcohol azeotrope is removed overhead. The bottoms from this column is substantially pure alcohol, which is recycled to the fixed bed etherification reactor, while the azeotrope is sent to the decomposition zone.

It is claimed:
1. In a process for the separation of tertiary monoolefin of 4 to 7 carbon atoms in admixture with another monoolefin hydrocarbon in approximately the same boiling range, the steps which comprise reacting selectively tertiary mono olefin of the mixture with a primary alcohol of 1 to 6 carbon atoms to obtain the corresponding primary tertiary ether, separating the primary tertiary ether from unreacted hydrocarbons, decomposing the ether by contact with a strong acid catalyst selected from the group consisting of a solid phosphoric acid catalyst and a solid polystyrene sulfonic acid resin catalyst at a temperature of about 100 to 400° F. and recovering tertiary mono olefin product and primary alcohol of 1 to 6 carbon atoms.

2. The process of claim 1 in which the ether is decomposed by contact with a polystyrene sulfonic acid ion exchange resin solid catalyst at a temperature of about 100 to 350° F.

3. The process of claim 1 in which the ether is decomposed by contact with a polyphosphoric acid catalyst.

4. In a process for the separation of tertiary mono olefin of 4 to 6 carbon atoms in admixture with another mono olefin in approximately the same boiling range, the steps which comprise contacting the mixture in the liquid phase with a primary alcohol of 1 to 2 carbon atoms over a sulfonic acid exchange resin catalyst at a temperature of about 100 to 350° F. to obtain selectively the corresponding primary tertiary ether, separating the primary tertiary ether from unreacted hydrocarbons, decomposing the ether by contact with a strong acid solid catalyst selected from the group consisting of a solid phosphoric acid catalyst and a solid polystyrene sulfonic acid resin catalyst at a temperature of about 100 to 400° F. and recovering tertiary mono olefin product and primary alcohol of 1 to 2 carbon atoms.

5. The process of claim 4 in which the ether is decomposed by contact with a polyphosphoric acid catalyst at a temperature of about 200 to 350° F.

6. The process of claim 4 in which the ether is decomposed by contact with a polystyrene sulfonic acid resin solid catalyst at a temperature of about 100 to 350° F.

7. The process of claim 6 in which the polystyrene resin is cross-linked with divinylbenzene.

8. In a process for the production of tertiary monoolefin of 4 to 7 carbon atoms, the step which comprises contacting ether of the formula R—O—R′ in which R is an aliphatic hydrocarbon radical of 4 to 7 carbon atoms having a tertiary carbon atom in the alpha-position and R' is a primary aliphatic hydrocarbon radical of 1 to 6 carbon atoms with a polystyrene sulfonic acid solid resin catalyst at a temperature of about 100 to 350° F. to produce tertiary olefin of 4 to 7 carbon atoms and recovering tertiary monoolefin from the reaction process.

9. The process of claim 8 in which the polystyrene sulfonic acid resin catalyst is cross-linked with divinylbenzene.

References Cited in the file of this patent

UNITED STATES PATENTS

| | | |
|---|---|---|
| 1,968,601 | Edlund et al. | July 31, 1934 |
| 2,375,724 | Anderson et al. | May 8, 1945 |
| 2,480,940 | Leum et al. | Sept. 6, 1949 |
| 2,544,392 | Moore et al. | Mar. 6, 1951 |
| 2,857,423 | Isler et al. | Oct. 21, 1958 |
| 2,922,822 | Beach | Jan. 26, 1960 |